(12) United States Patent
Tsai et al.

(10) Patent No.: US 8,467,616 B2
(45) Date of Patent: Jun. 18, 2013

(54) IMAGE PROCESSING METHOD

(75) Inventors: Chi-Chung Tsai, Kinmen County (TW); Wen-Chih Tai, Taoyuan County (TW); Chia-Lin Liu, Taichung County (TW); Chi-Neng Mo, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 987 days.

(21) Appl. No.: 12/535,696

(22) Filed: Aug. 5, 2009

(65) Prior Publication Data
US 2010/0260418 A1    Oct. 14, 2010

(30) Foreign Application Priority Data
Apr. 13, 2009   (TW) ............................... 98112178 A

(51) Int. Cl.
*G06K 9/36*   (2006.01)
*G06K 9/00*   (2006.01)

(52) U.S. Cl.
USPC .......................................... 382/232; 382/154

(58) Field of Classification Search
USPC   382/154, 100, 232–253; 345/419; 348/42–60
See application file for complete search history.

(56) References Cited

U.S. PATENT DOCUMENTS

| | | | |
|---|---|---|---|
| 7,796,808 B2* | 9/2010 | Shioi et al. | 382/154 |
| 7,859,529 B2* | 12/2010 | Tokumo et al. | 345/419 |
| 2008/0062172 A1 | 3/2008 | Lin | |

FOREIGN PATENT DOCUMENTS

| | | |
|---|---|---|
| JP | 2004264882 | 9/2004 |
| TW | 200628906 | 8/2006 |

* cited by examiner

*Primary Examiner* — Ishrat I Sherali
(74) *Attorney, Agent, or Firm* — Winston Hsu; Scott Margo

(57) ABSTRACT

An image processing method includes the following steps. First, an image data is provided. The image data includes at least one first image section and at least one second image section. Then, an image distribution data is provided. The image distribution data records a position of the first image section and a position of the second image section. Next, an encoding step is performed to bury the image distribution data in the image data so as to form a frame data.

5 Claims, 18 Drawing Sheets

Perform a first gray-level value converting step to convert a gray-level value of each sub-pixel data located in the first image section into a first color gray-level value ~S32

Perform a second gray-level value converting step to convert a gray level value of each sub-pixel data located in a second image section into a second color gray-level value so as to generate a difference of a lowest bit between the first color gray-level value and the second color gray-level value, and the image distribution data is buried in the difference of the bit ~S34

|  | R | G | B |
|---|---|---|---|
| Gray-level value | 247 | 92 | 30 |
| First color gray-level value | 247 | 92 | 30 |
| Second color gray-level value | 247 | 92 | 31 |

FIG. 7

IMAGE PROCESSING METHOD

BACKGROUND OF THE INVENTION

1. Field of the Invention

The present invention relates to an image processing method, and more particularly, to an image processing method of combining two-dimensional images and three-dimensional images.

2. Description of the Prior Art

The reason why a human being has stereoscopic vision is that two eyes of the human being can individually see the outside vision, which means that a view of scenery seen by a left eye and a view of the scenery seen by a right eye are different in viewing angle. When the scenery with different viewing angles seen by two eyes is naturally fused by the brain, a stereoscopic image can be shown in the brain of the human being.

In prior art stereoscopic display devices, the observer is required to wear a glasses device, such as shutter glasses or polarization glasses, so as to see a left-eye image and a right-eye image respectively through a left eye and a right eye, which is like a real object seen by the left eye and the right eye. Therefore, a stereoscopic image is generated. However, to wear and to carry the glasses device make observers feel inconvenient. Accordingly, in order to improve the inconvenience of using the glasses device, a lenticular and a parallax barrier have been provided to apply to the stereoscopic display device recently. These are called parallax barrier type stereoscopic liquid crystal display (LCD) device. The parallax barrier type stereoscopic LCD device do not require the shutter glasses or the polarization glasses, and only requires disposing a specific optical device, such as lenticular lens or parallax barrier device, on a front side or a back side of an LCD panel so as to show a stereoscopic image.

Refer to FIG. 1 and FIG. 2. FIG. 1 is an exploded schematic diagram illustrating a parallax barrier type stereoscopic LCD device according to the prior art. FIG. 2 is a functional block diagram illustrating a stereoscopic image-processing device according the prior art. As shown in FIG. 1, the parallax barrier type stereoscopic LCD device 10 includes a backlight 12, an LCD panel 14 and a parallax barrier panel 16. The backlight 12 and the parallax barrier panel 16 are respectively disposed on two sides of the LCD panel 14. The LCD panel 14 and the parallax barrier panel 16 both are LCD panels, but functions of the LCD panels are different. The LCD panel 14 is used for displaying an image, and the image is only a two-dimensional image. Accordingly, since the two-dimensional image passes through the parallax barrier panel 16, the two-dimensional image can be converted into a three-dimensional image by shielding effect of a lenticular generated by the parallax barrier panel 16. The parallax barrier type stereoscopic LCD device 10 not only can display a whole two-dimensional image or a whole three-dimensional image, but also can display a frame with partially two-dimensional images and partially three-dimensional images. Therefore, if the frame with the three-dimensional images requires being displayed, an image data requires being provided to the LCD panel 14, and a three-dimensional image distribution data requires being provided to the parallax barrier panel 16. As shown in FIG. 2, two outputs 20 of an image player 18 respectively transfer the image data and the three-dimensional distribution data to two inputs 22 of the stereoscopic LCD device 10. The image data is transferred to the LCD panel 14, and the three-dimensional image distribution data is transferred to the parallax barrier panel 16. At this time, the LCD panel 14 can display an image according to the image data, and the parallax barrier panel 16 can generate a parallax barrier according to the three-dimensional image distribution data. A region having a parallax barrier corresponds to a region that requires displaying the three-dimensional images. Due to the parallax barrier, a left eye of an observer can only see the image for the left eye, and a right eye of the observer can only see the image for the right eye. Therefore, a display having a stereoscopic effect can be shown.

However, three-dimensional image processing method of the prior art involves respectively transferring the image data and the three-dimensional distribution data. For this reason, the image player requires providing two outputs, and the parallax barrier type LCD device requires providing two inputs so as to match transference of the three-dimensional image. As compared with a display device only displaying the two-dimensional image, the image player and the stereoscopic display device for displaying the three-dimensional image require adding an extra output and an extra input to transfer the three-dimensional image distribution data, so that the disadvantage of increase in hardware cost for displaying the three-dimensional image is generated. Therefore, to improve the disadvantage is an important objective that industry aims to achieve.

SUMMARY OF THE INVENTION

It is therefore a primary objective of the present invention to provide an image processing method for displaying two-dimensional images and three-dimensional images simultaneously.

According to an embodiment of the present invention, an image processing method is provided. First, an image data is provided. The image data comprises at least one first image section and at least one second image section. Then, an image distribution data is provided. The image distribution data records a position of the first image section and a position of the second image section. Next, an encoding step is performed to bury the image distribution data in the image data so as to form a frame data.

According to another embodiment of the present invention, an image processing method is provided. First, an image data with a first resolution is provided. The image data comprises at least one first image section and at least one second image section. Then, an image distribution data is provided. The image distribution data records a position of the first image section and a position of the second image section. Next, an encoding step is performed to mix the image distribution data and the image data to be a frame data with a second resolution.

According to another embodiment of the present invention, an image processing method used for processing an image of an interlaced stereoscopic display device is provided. First, a first frame data is provided. The first frame data comprises a two-dimensional image data and a first viewing angle image data. Then, a second viewing angle image data is provided. Thereafter, an image distribution data is provided. The image distribution data records a position of the first viewing angle image data and a position of the second viewing angle image data. Next, an encoding step is performed to mix the image distribution data and the second viewing angle image data to be a second frame data so as to define the position of the second viewing angle image data and the position of the first viewing angle image data through the image distribution data.

The image processing method of the present invention mixes the image data and the image distribution data to be a frame data so as to reduce an output and an input between the image player and the display device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a table illustrating an example of the gray-level value, the first color gray-level value and the second color gray-level value of this embodiment.

DETAILED DESCRIPTION

Figure 1:
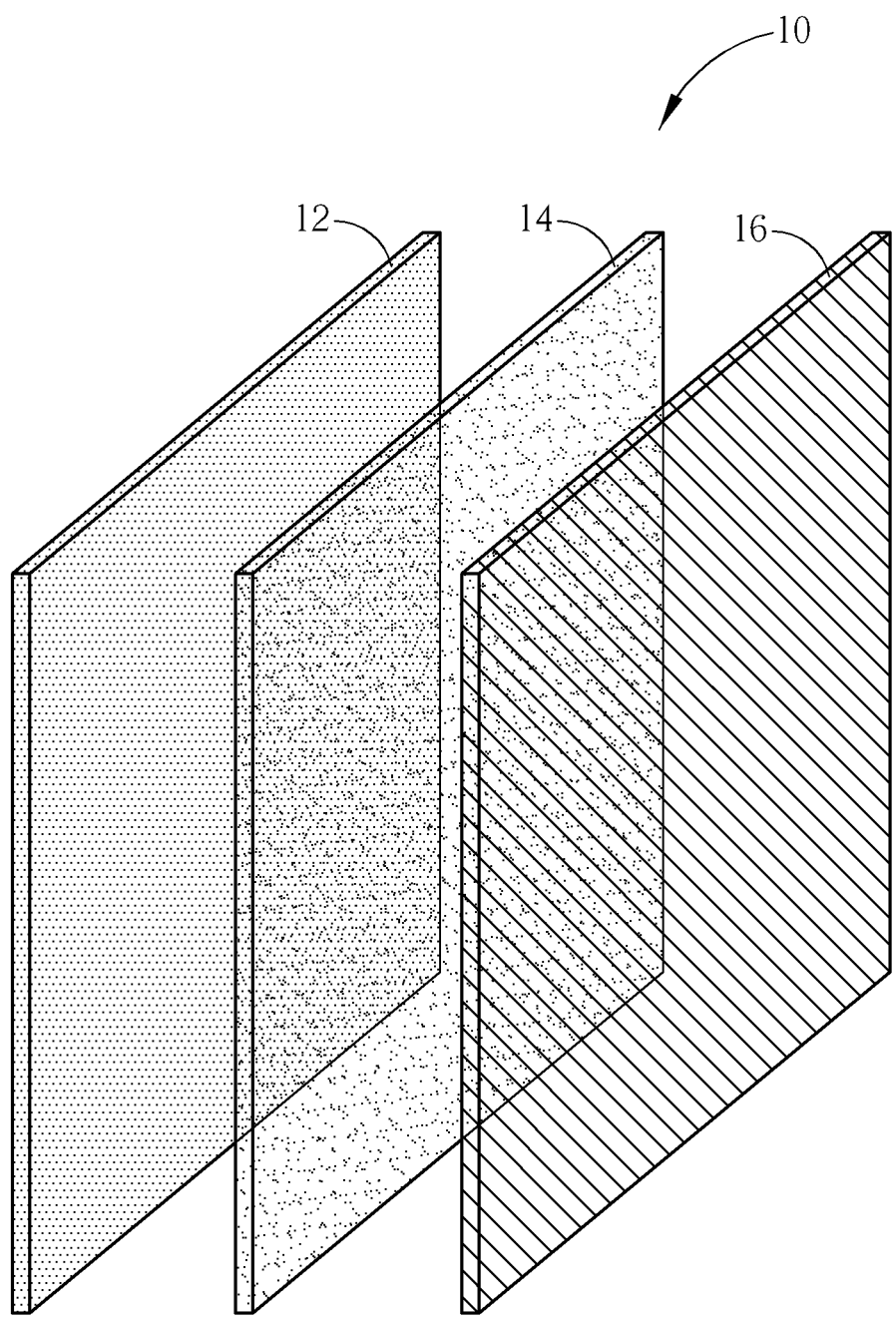
FIG. 1 is an exploded schematic diagram illustrating a parallax barrier type stereoscopic LCD device according to the prior art.
Figure 2:
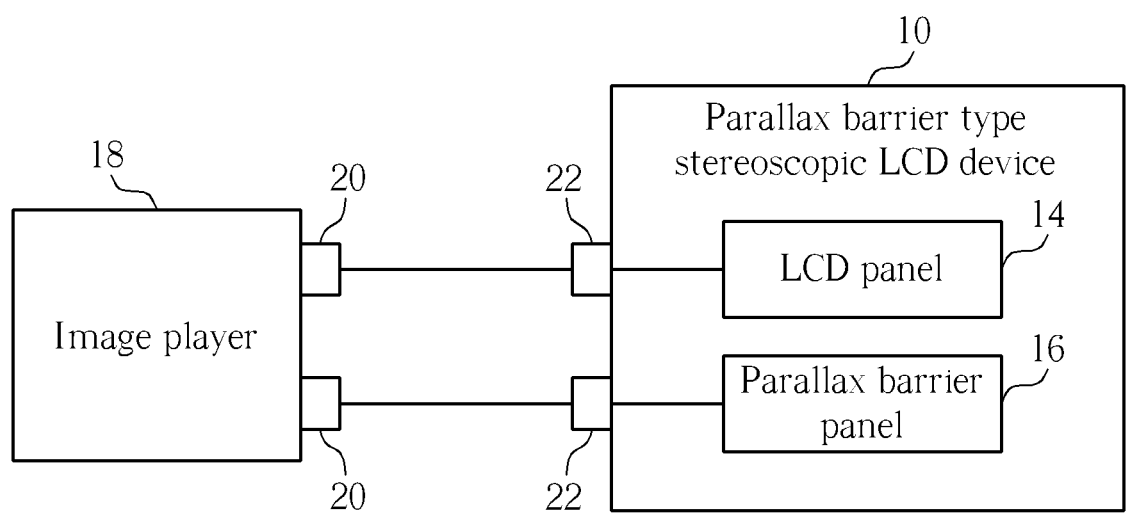
FIG. 2 is a functional block diagram illustrating a stereoscopic image-processing device according the prior art.
Figure 3:
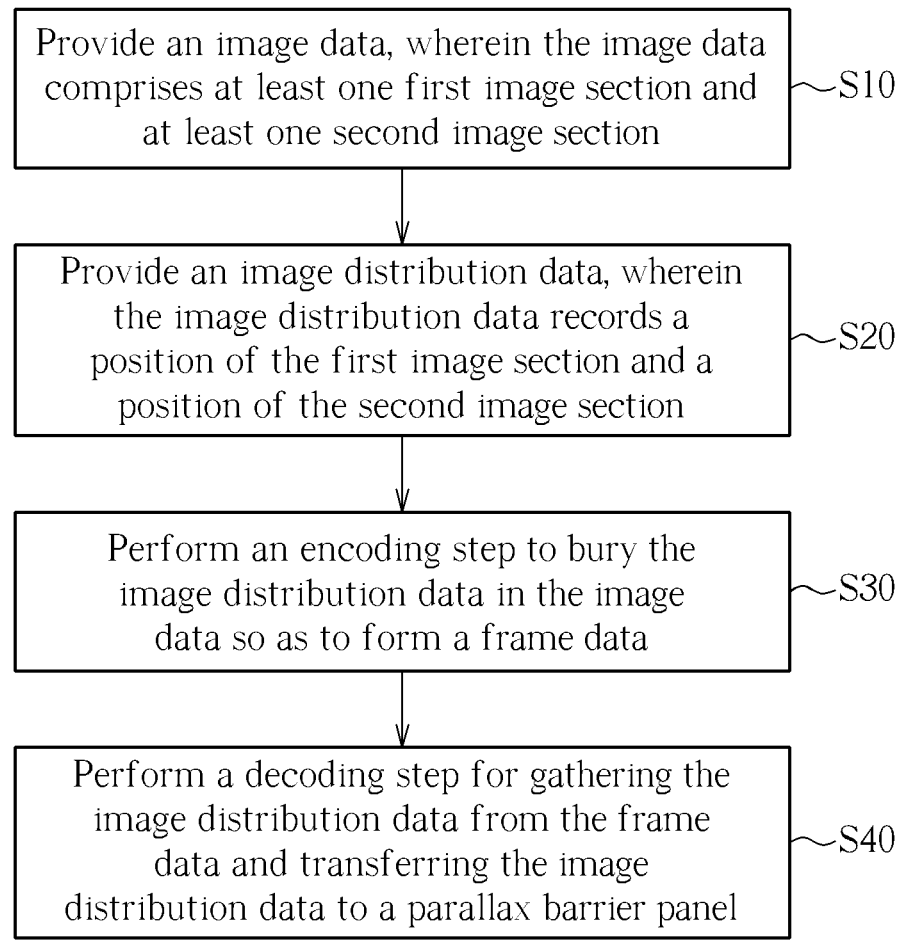
FIG. 3 is a flowchart illustrating an image processing method according to a first embodiment of the present invention.
Figure 4:
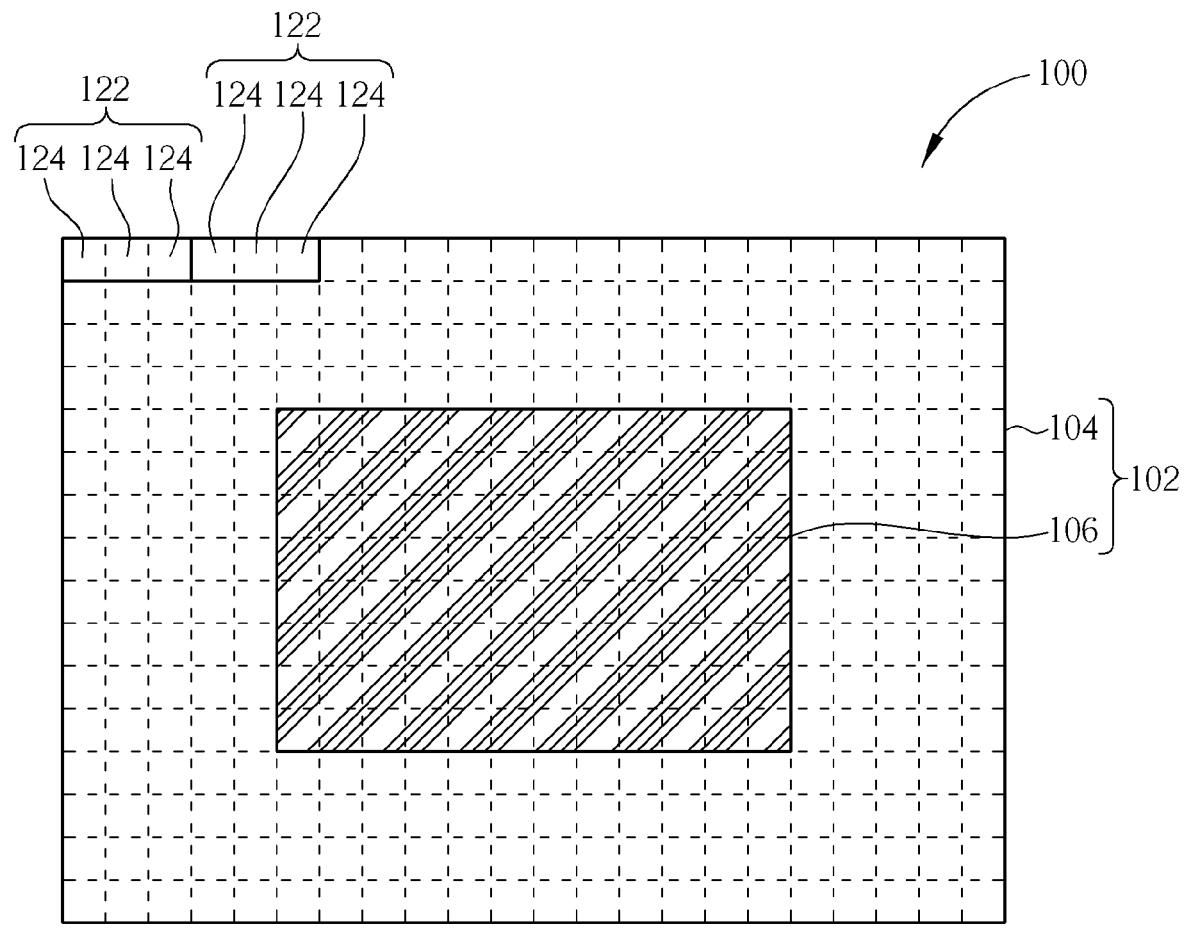
FIG. 4 is a schematic diagram illustrating a frame data of the first embodiment.
Figure 5:
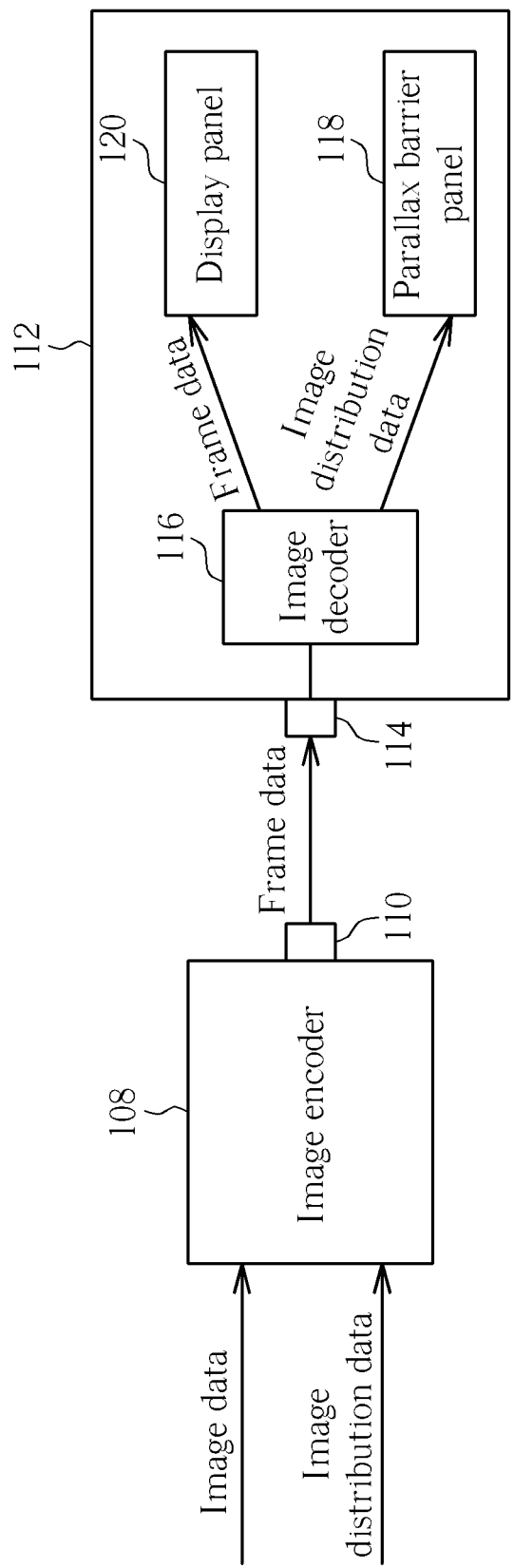
FIG. 5 is a functional block diagram illustrating an image processing device of the present invention.

Please refer to FIG. 3 through FIG. 5. FIG. 3 is a flow chart illustrating an image processing method according to a first embodiment of the present invention. FIG. 4 is a schematic diagram illustrating a frame data of the first embodiment. FIG. 5 is a functional block diagram illustrating an image processing device of the present invention. As shown in FIG. 3 and FIG. 4, the image processing method includes the following steps:

Step S10: provide an image data 102, wherein the image data 102 comprises at least one first image section 104 and at least one second image section 106;

Step S20: provide an image distribution data, wherein the image distribution data records a position of the first image section 104 and a position of the second image section 106;

Step S30: perform an encoding step to bury the image distribution data in the image data 102 so as to form a frame data 100.

Step S40: perform a decoding step for gathering the image distribution data from the frame data 100 and transferring the image distribution data to a parallax barrier panel.

In step S10, the first image section 104 of this embodiment is a two-dimensional image, and the second image section 106 is a three-dimensional image. The present invention is not limited to this condition, and the first image section 104 and the second image section 106 can be exchanged, so that the first image section 104 is a three-dimensional image, and the second image section 106 is a two-dimensional image. In addition, as shown in FIG. 5, the image data 102 in step S10 and the image distribution data in step S20 are transferred to an image encoder 108, such as an encoding device in an image player, used for mixing the image data 102 and the image distribution data. Accordingly, the formed frame data 100 transferred from an output 110 of the image encoder 108 to an input 114 of a stereoscopic display device 112 only require one transmission line, and do not require two outputs and two inputs of the prior art image processing method to transfer the image data 102 and the image distribution data. Furthermore, the decoding step of step S40 utilizes an image decoder 116 of the stereoscopic display device 112, such as decoding device in a timing controller, to gather the image distribution data from the frame data 100. Then, the image distribution data can be provided to the parallax barrier panel 118, and the frame data 100 can be provided to a display panel 120. Therefore, the stereoscopic display device 112 can display a frame with two-dimensional images and three-dimensional images. In addition, the display panel 120 and the parallax barrier panel 118 stack together. For this reason, the frame displayed by the display panel 120 can be shielded by the parallax barrier panel 118 so as to show the three-dimensional images. The display panel 120 can be a display device, such as LCD panel, plasma display panel or organic electroluminescent display panel. The parallax barrier panel 118 can be a parallax barrier with a partially transparent and partially shielding function, such as liquid crystal panel, but the present invention is not limited to this.

Figure 6:
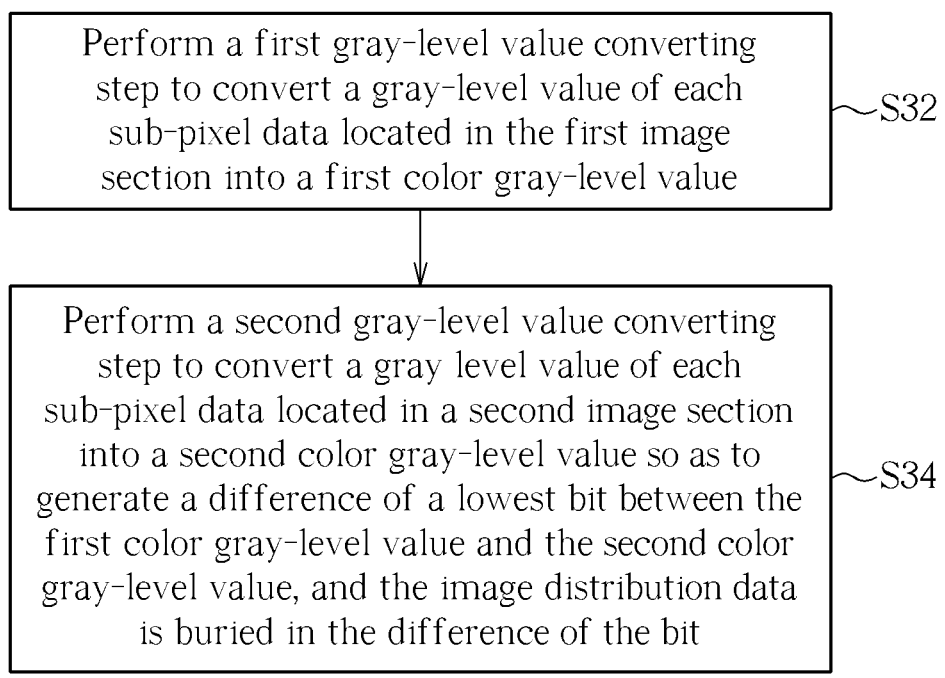
FIG. 6 is a flow chart illustrating the encoding step of the first embodiment.

The encoding step of this embodiment is detailed clearly in the following description. Please refer to FIG. 6, and refer to FIG. 4 together. FIG. 6 is a flow chart illustrating the encoding step of the first embodiment. As shown in FIG. 4 and FIG. 6, the image data 102 is composed of a plurality of pixel data 122, and each pixel data 122 has a plurality of sub-pixel data 124. The sub-pixel data 124 in a same pixel data 122 have different colors, such as red, green and blue, and each sub-pixel data has a color gray-level value. It should be noted that the encoding step of step S30 is performed for each sub-pixel data 124 having a same color, and the encoding step includes the following step:

Step S32: perform a first gray-level value converting step to convert a gray-level value of each sub-pixel data 124 located in the first image section 104 into a first color gray-level value; and Step S34: perform a second gray-level value converting step to convert a gray level value of each sub-pixel data 124 located in a second image section 106 into a second color gray-level value so as to generate a difference of a bit between the first color gray-level value and the second color gray-level value, and the image distribution data is buried in the difference of the bit.

In the encoding step of this embodiment, an operating formula of the first gray-level value converting step is $G_1 = [G_0/2] \times 2 + 0$, and an operating formula of the second gray-level value converting step is $G_2=[G_0/2]\times 2+1$, wherein $G_0$ is the gray-level value of each sub-pixel data 124, $G_1$ is the first color gray-level value, and $G_2$ is the second color gray-level value. Brackets [ ] represent a Gaussian symbol, and the Gaussian symbol is used to get an integral part of the value in the brackets for calculation, or to eliminate a lowest bit of a binary file to be zero. In addition, please refer to FIG. 7, which is a table illustrating an example of the gray-level value, the first color gray-level value and the second color gray-level value of this embodiment. As shown in FIG. 7, this embodiment takes a sub-pixel data with eight bits as an example, but is not limited to this. The present invention also can use a sub-pixel data with six bits, ten bits or larger bits. Before the encoding step, a gray-level value of a red sub-pixel data is 247 represented in decimal system, and is 11110111 represented in binary digits. A gray-level value of a green sub-pixel data is 92 represented in decimal system, and is 01011100 represented in binary digits. A gray-level value of a blue sub-pixel data is 30 represented in decimal system, and is 00011110 represented in binary digits. After the encoding step, the gray-level value of the blue sub-pixel data located in the first image section can be converted into the first color gray-level value through the first gray-level value converting step. The first color gray-level value is 30 represented in decimal system, and is 00011110 represented in binary digits. The gray-level value of the blue sub-pixel data located in the second image section can be converted into the second color gray-level value through the second gray-level value converting step. The second color gray-level value is 31 represented in decimal system, and is 00011111 represented in binary digits. Therefore, after the encoding step, the blue sub-pixel data located in the first image section and the blue sub-pixel data located in the second image section have a difference of a lowest bit. According the difference of the lowest bit between the blue sub-pixel data in the first image section and the blue sub-pixel data in the second image section, the first image section and the second image section can be distinguished, and the image distribution data can be buried in the difference of the lowest bit between the blue sub-pixel data. In addition, the sub-pixel data for burying the image distribution data of the present invention is not limited to be the blue sub-pixel data, and can be red sub-pixel data or green sub-pixel data. Or, the image distribution data is buried in at least two of red, green and blue sub-pixel data. Because sensitive degree of human eyes for sensing three primary colors is green, red and blue in sequence, the sub-pixel data used for encoding is preferred to be the blue sub-pixel data.

Figure 8:
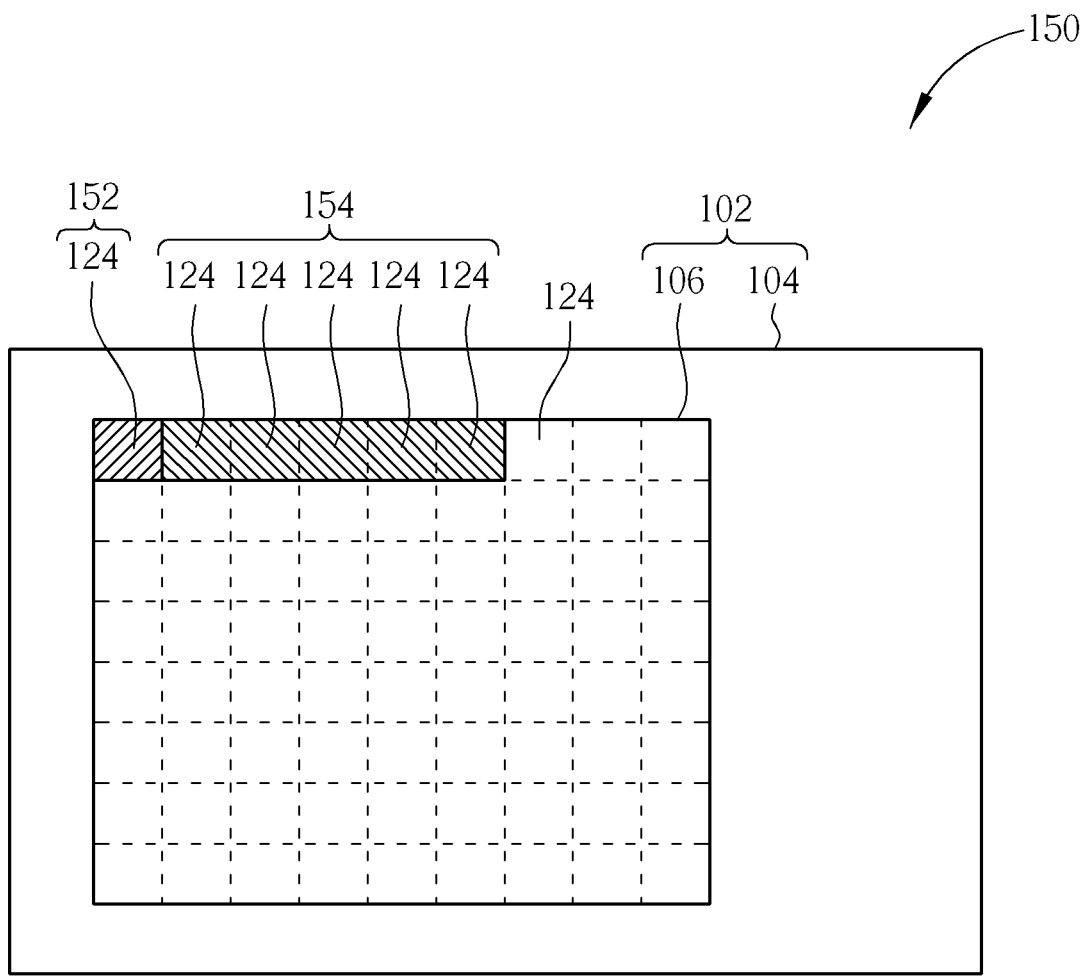
FIG. 8 is a schematic diagram illustrating a frame data according to a second embodiment of the present invention.

The encoding step of the present invention is not limited that the image distribution data should be buried in the sub-pixel data with the same color of all pixel data, and the image distribution data also can only be buried in a part of the pixel data. For convenience, devices of the following embodiments which are the same as the first embodiment are denoted with the same labels, and the same steps and the transferring step will therefore not be detailed again. Please refer to FIG. 8, which is a schematic diagram illustrating a frame data according to a second embodiment of the present invention. As shown in FIG. 8, as compared with the first embodiment, the encoding step of this embodiment includes burying a start key 152 of the image distribution data in at least one sub-pixel data 124 and burying an image distribution key 154 of the image distribution data in at least one sub-pixel data 124 after the sub-pixel data 124 with the start key 152 to define the position of the second image section 106. Then, a frame data 150 is formed. The sub-pixel data 124 with the start key 152 is located at a start position of the second image section 106. In the decoding step of this embodiment, the image decoder can read the start key 152 first, and determine that the frame data 150 of the second image section 106 starts to be read. Then, when the image distribution key 154 is read, the information, such as position, size and shape, of the second image section 106 can be gathered. Next, the image distribution data is transferred to the parallax barrier panel so as to display the three-dimensional image of the second image section 106. Furthermore, as compared with the first embodiment, the image processing method of this embodiment do not require encoding all sub-pixel data with the same color, and only requires burying the image distribution key 154 recording the positions of the first image section 104 and the second image section 106 in the start position of the second image section 106. Accordingly, the image distribution data can be gathered from the frame data 150. For this reason, the image processing method of this embodiment can efficiently reduce encoding time and decoding time.

Figure 9:
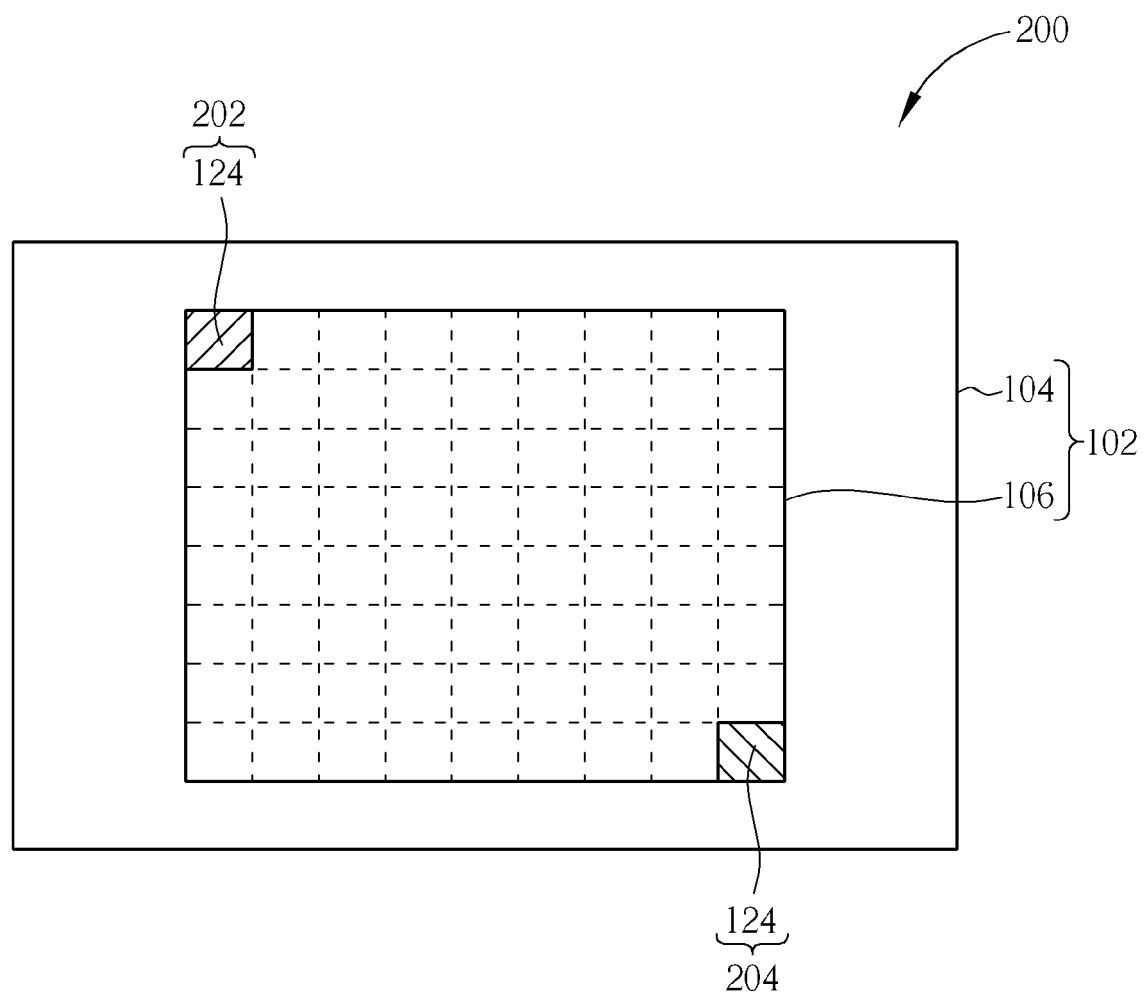
FIG. 9 is a schematic diagram illustrating a frame data according to a third embodiment of the present invention.

In addition, the present invention also can use the start key and an end key to bury the image distribution data. Please refer to FIG. 9, which is a schematic diagram illustrating a frame data according to a third embodiment of the present invention. As shown in FIG. 9, as compared with the first embodiment, the encoding step of this embodiment includes burying a start key 202 of the image distribution data in at least one sub-pixel data 124 and burying an end key 204 in at least one sub-pixel data 124. The sub-pixel data 124 with the start key 202 is located at a start position of the second image section 106, and the sub-pixel data 124 with the end key 204 is located at an end position of the second image section 106 so as to define the position of the second image section 106. Then, a frame data 200 is therefore formed. In the decoding step of this embodiment, when the image decoder reads the start key 202, the image decoder determines that the frame data 200 of the second image section 106 starts to be read. Then, until reading the end key 204, the frame data 200 of the second image section 106 is not judged to be ended. For this reason, position, size or shape of the second image section 106 can be confirmed. The image distribution data can be gathered, and be transferred to the parallax barrier panel. The second image section 106 can be a section with a specific shape, such as rectangular In order to prevent erroneous judgment for the position of the second image section 106 caused by missing reading the start key 202 or the end key 204, the start key 202 or the end key 204 can be buried in a plurality of sub-pixel data 124.

Figure 10:
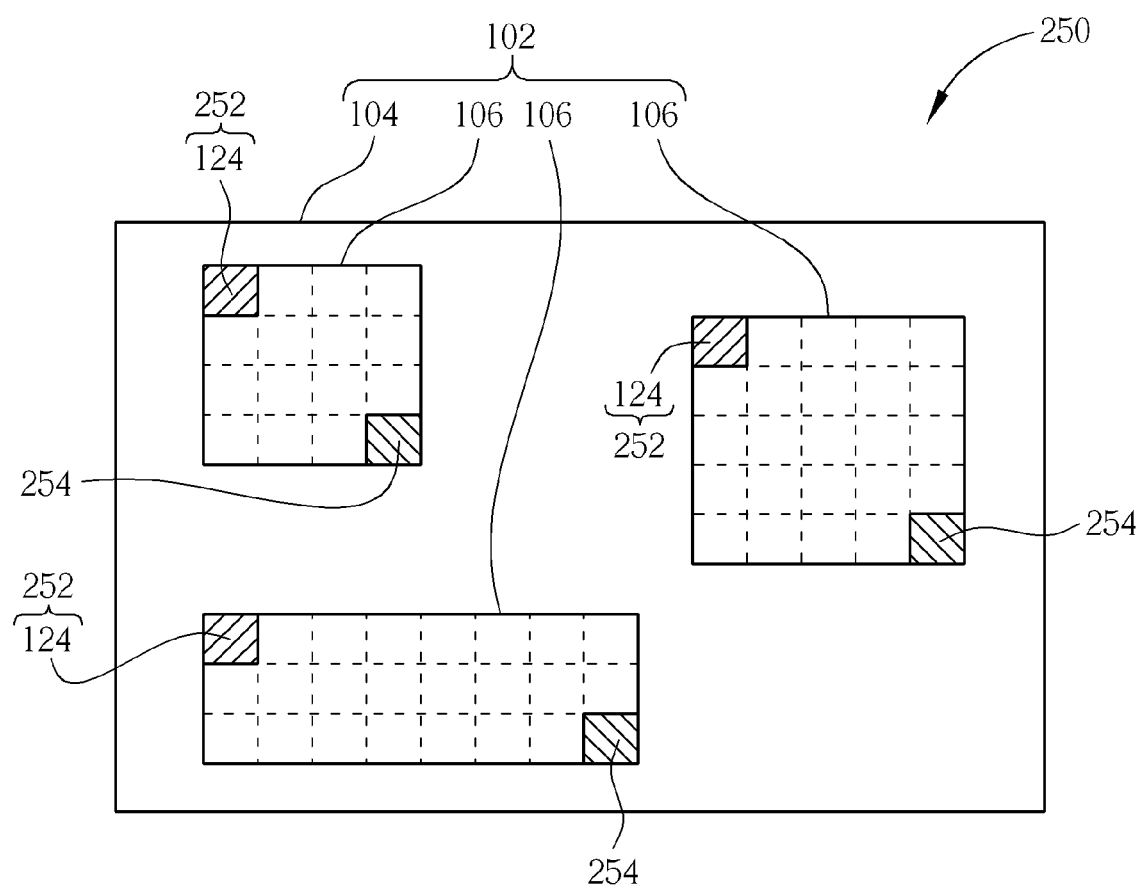
FIG. 10 is a schematic diagram illustrating a frame data according to a fourth embodiment of the present invention.
Figure 11:
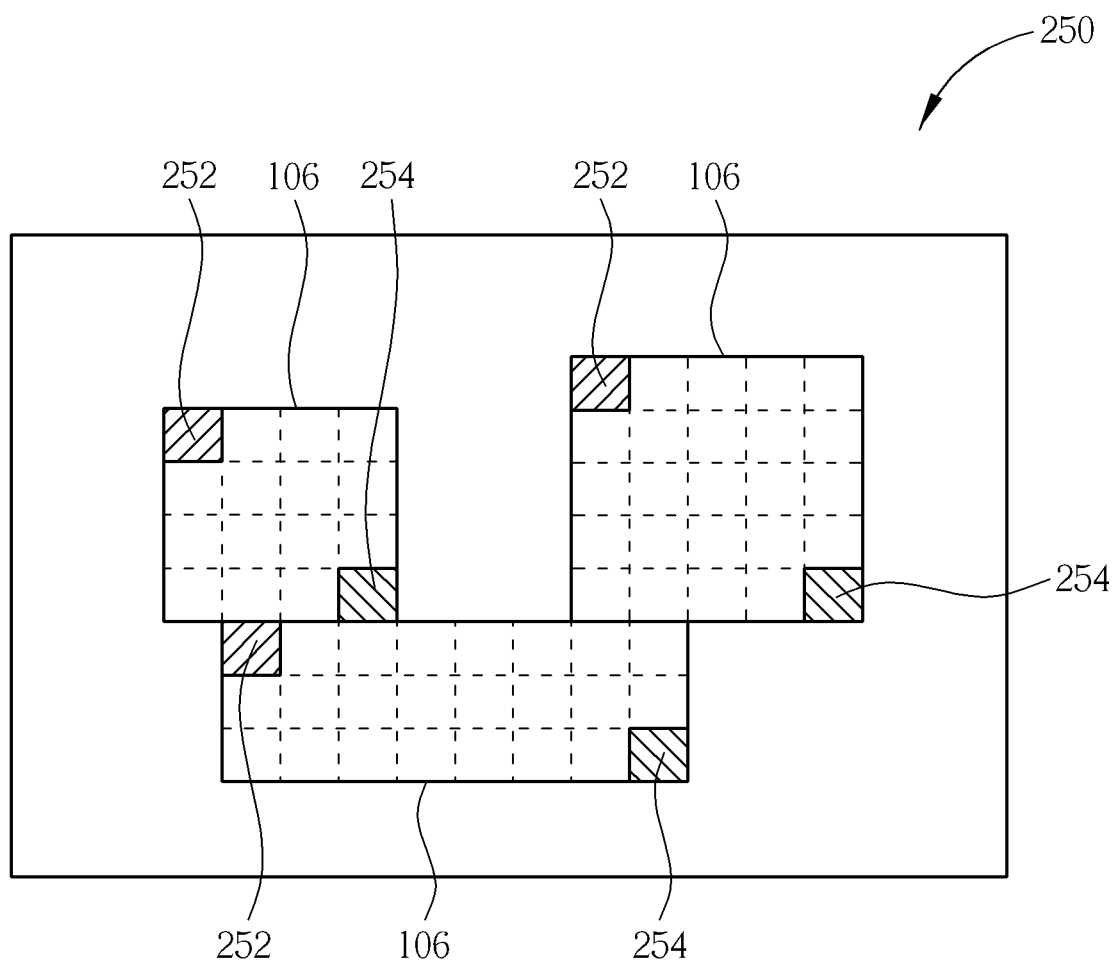
FIG. 11 is a schematic diagram illustrating another example of a frame data according to the fourth embodiment of the present invention.

The present invention is not limited to only have an image section, and the present invention can have a plurality of image sections. Please refer to FIG. 10, which is a schematic diagram illustrating a frame data according to a fourth embodiment of the present invention. As shown in FIG. 10, as compared with the third embodiment, the encoding step of this embodiment includes a plurality of start keys 252 and a plurality of end keys 254 respectively corresponding to the start keys 252. The start keys 252 and the end keys 254 are buried in the image data 102, and the start keys 252 and the end keys 254 can define positions of a plurality of second image sections 106. The start keys 252 of this embodiment are respectively buried in at least one sub-pixel data 124, and the end keys 254 of this embodiment are respectively buried in at least one sub-pixel data 124. The sub-pixel data 124 with the start keys 252 are located at start positions of the corresponding second image sections 106. Each pair of the start key 252 and the corresponding end key 254 can define one second image section 106. It is worthy of note that the second image sections 106 of this embodiment do not connect to each other, but are not limited to this. Please refer to FIG. 11, which is a schematic diagram illustrating another example of a frame data according to the fourth embodiment of the present invention. As shown in FIG. 11, all the second image sections 106 of this example can be connected to be a section with an irregular shape. The irregular shape can be composed of a plurality of rectangles or specific shapes, and a plurality of the second image sections 106 having a specific shape and being connected can be defined by a plurality of pairs of the start keys 252 and the end keys 254.

Figure 12:
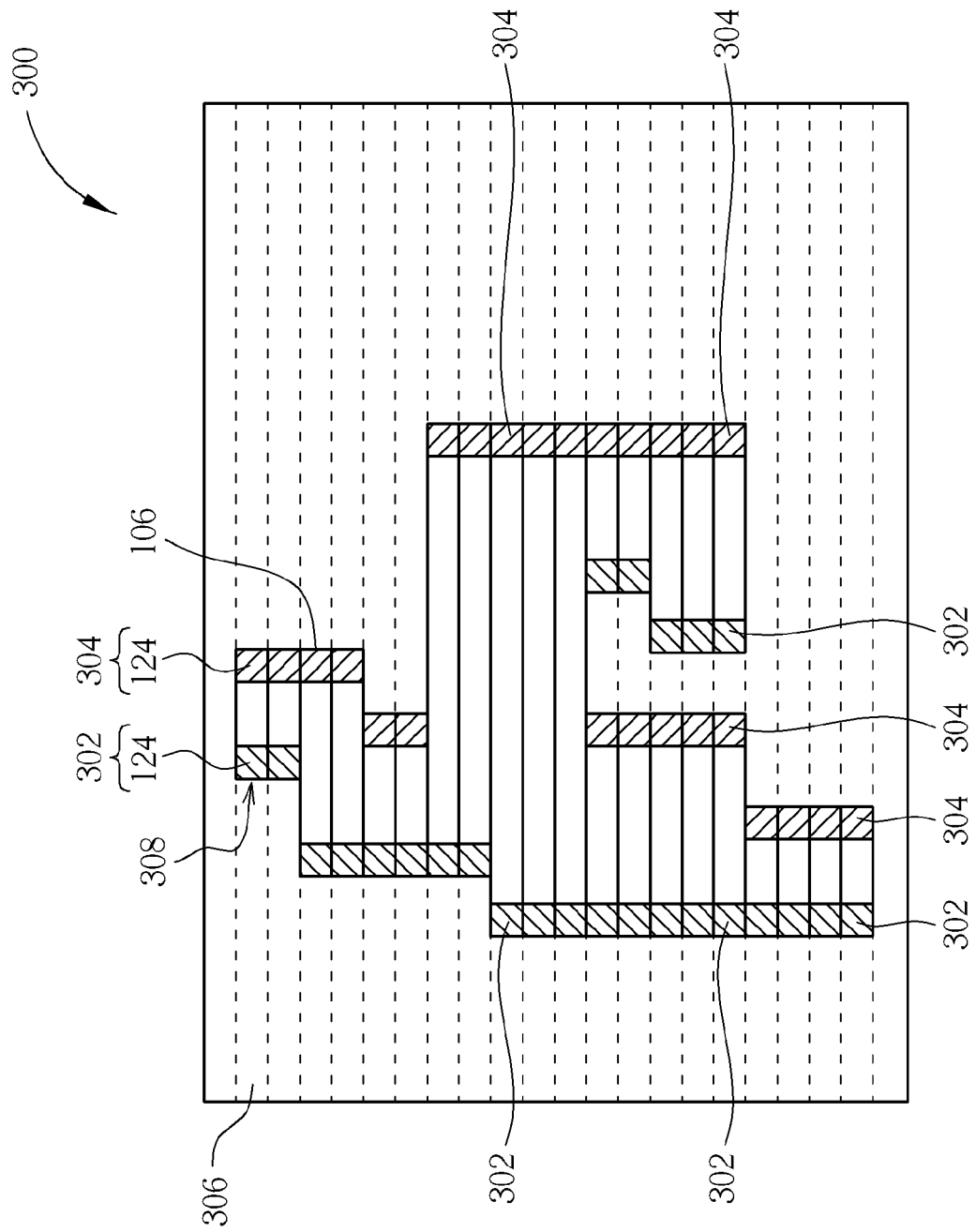
FIG. 12 is a schematic diagram illustrating a frame data according to a fifth embodiment of the present invention.

Please refer to FIG. 12, which is a schematic diagram illustrating a frame data according to a fifth embodiment of the present invention. As shown in FIG. 12, as compared with the fourth embodiment, each start key 302 and the corresponding end key 304 of this embodiment are located at a same pixel data row 306. It should be noted that this embodiment buries the start key 302 and the corresponding end key 304 respectively in at least one sub-pixel data 124 of the pixel data row 306 to define a pixel data segment 308 from the sub-pixel data 124 with the start key 302 to the sub-pixel data 124 with the end key 304. All pixel data segments 308 constitute the second image section 106. Furthermore, a plurality of pixel data segments 308 can be in the same pixel data row 306, and the second image section 106 with various shapes can be formed. This embodiment only requires reading a pixel data row 306, and the pixel data segment 308 in the same pixel data row 306 can be defined in the decoding step. Therefore, the consuming time of the image decoder for reading the start key and the corresponding end key in different pixel data rows can be reduced.

Figure 13:
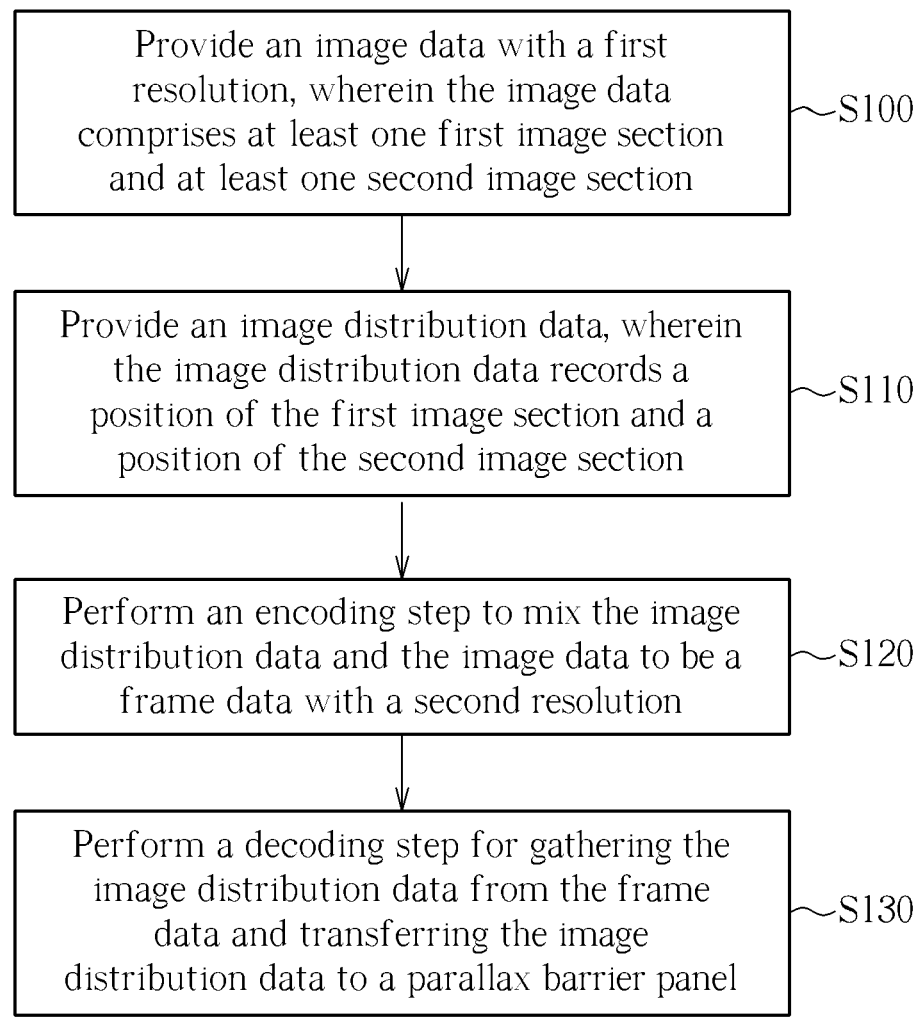
FIG. 13 is a flow chart illustrating an image processing method according to a sixth embodiment of the present invention.
Figure 14:
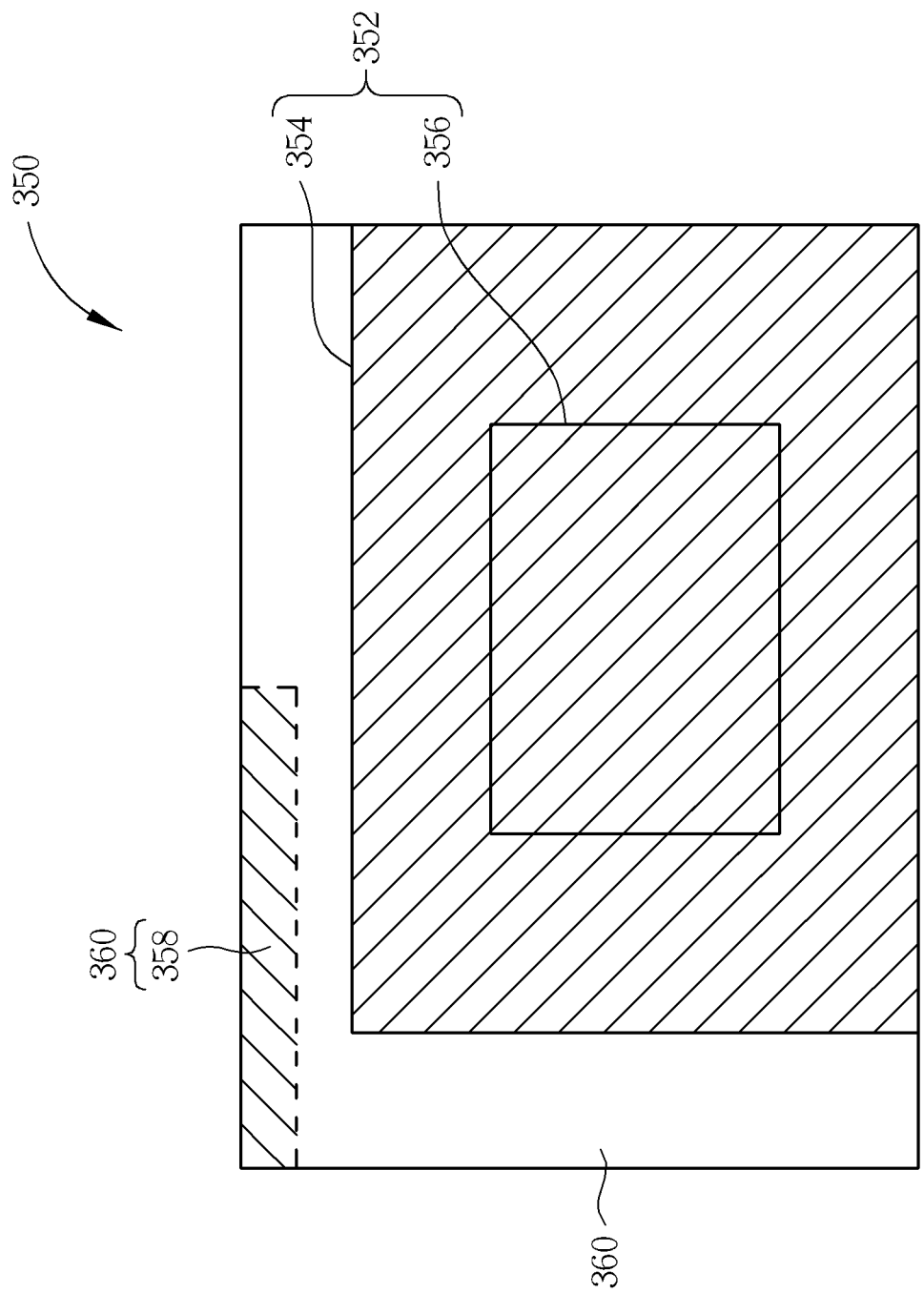
FIG. 14 is a schematic diagram illustrating a frame data according to the sixth embodiment of the present invention.

Please refer to FIG. 13 and FIG. 14. FIG. 13 is a flow chart illustrating an image processing method according to a sixth embodiment of the present invention. FIG. 14 is a schematic diagram illustrating a frame data according to the sixth embodiment of the present invention. As shown in FIG. 13 and FIG. 14, the image processing method includes the following steps:

Step S100: provide an image data 352 with a first resolution, wherein the image data 352 comprises at least one first image section 354 and at least one second image section 356;

Step S110: provide an image distribution data 358, wherein the image distribution data 358 records a position of the first image section 354 and a position of the second image section 356;

Step S120: perform an encoding step to mix the image distribution data 358 and the image data 352 to be a frame data 350 with a second resolution; and Step S130: perform a decoding step for gathering the image distribution data 358 from the frame data 350 and transferring the image distribution data 358 to a parallax barrier panel.

The first image section 354 of this embodiment can be a two-dimensional image, and the second image section 356 can be a three-dimensional image. The present invention is not limited to this, and the image types of the first image section 354 and the second image section 356 can be exchanged. It should be noted that this embodiment mixes the image distribution data 358 and the image data 352 to be the frame data 350 with the second resolution larger than the first resolution, and buries the image distribution data in extra memory spaces 360 of the second resolution larger than the first resolution so as to contribute to transfer the image distribution data 358 and the image data 352 by using one output and one input. For example, the first resolution of the image data 352 is 1280×800, and the second resolution of the frame data 350 in the encoding step of step S120 is 1440×900. The image distribution data 358 can be buried in the extra memory spaces 360 of the second resolution with 1440×900 larger than the first resolution with 1280×800. Then, in the decoding step, the part of the image data 352 with 1280×800 in the frame data can be reserved and transferred to a display panel, and the image distribution data 358 can be gathered from the frame data 350 and transferred to the parallax barrier panel.

Figure 15:
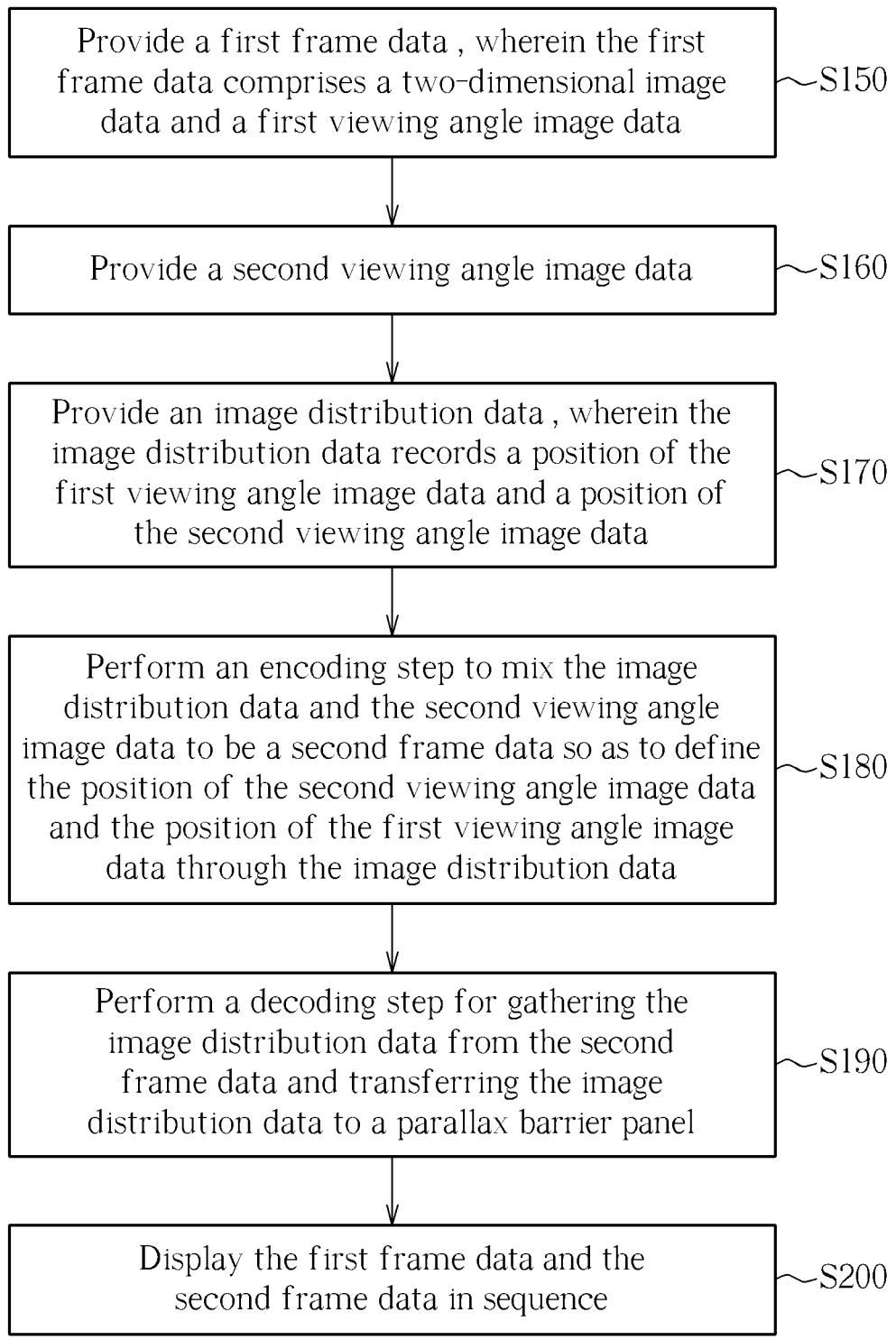
FIG. 15 is a flow chart illustrating an image processing method according to a seventh embodiment of the present invention.
Figure 16:
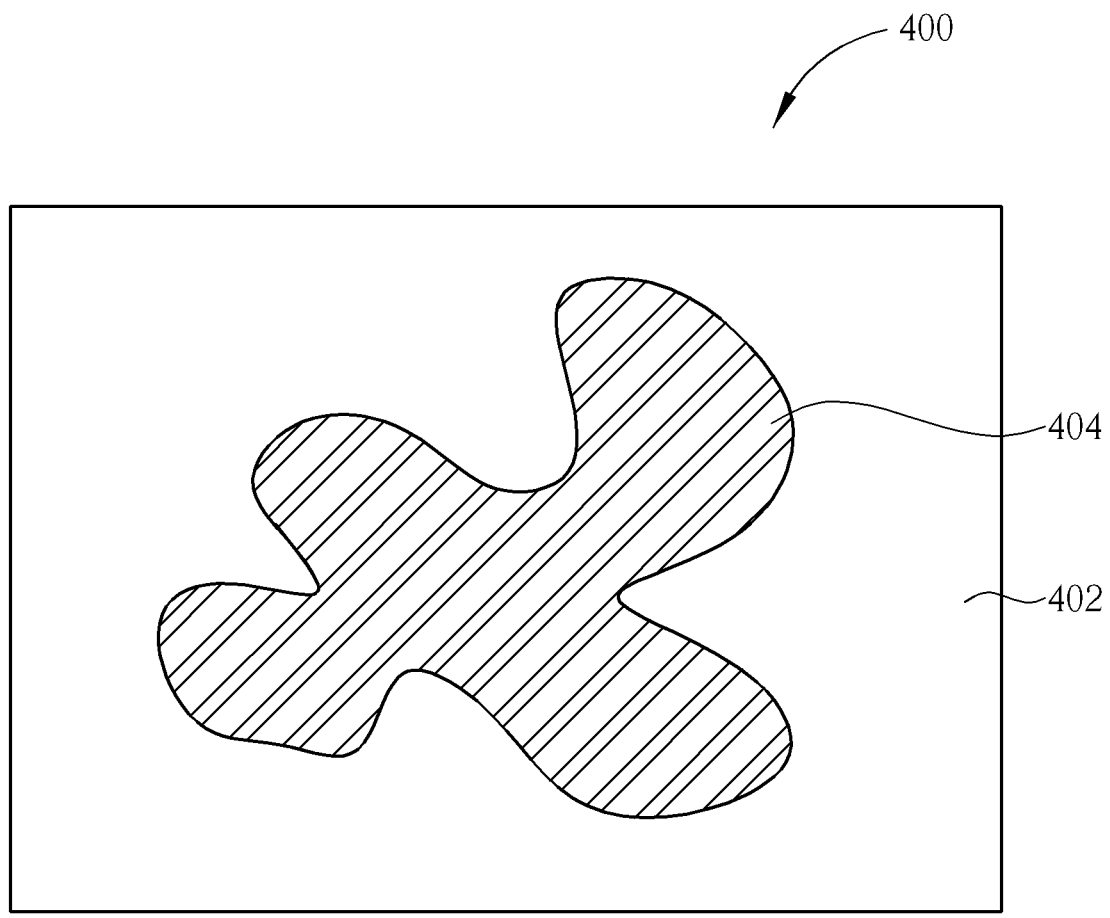
FIG. 16 and FIG. 17 are schematic diagrams illustrating a frame data of the seventh embodiment.
Figure 17:
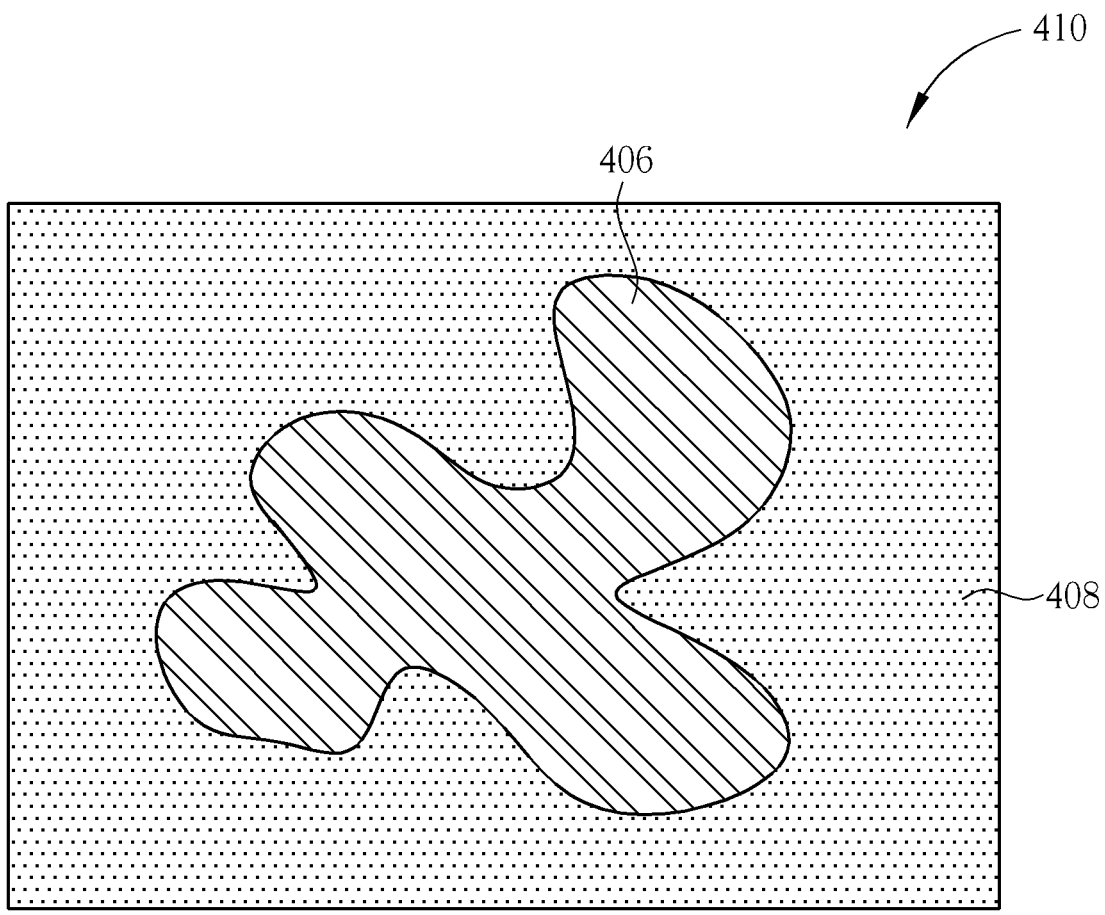
Figure 18:
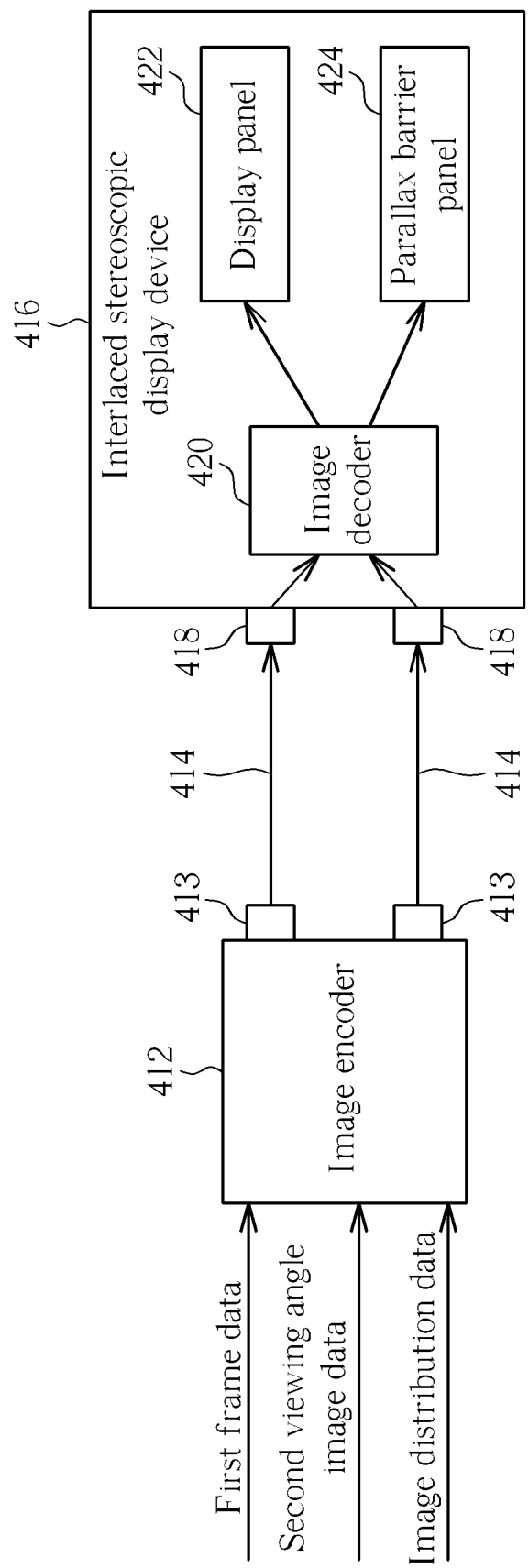
FIG. 18 is a functional block diagram illustrating an image processing device for an interlaced stereoscopic display device.

Please refer to FIG. 15 through FIG. 18. FIG. 15 is a flow chart illustrating an image processing method according to a seventh embodiment of the present invention. FIG. 16 and FIG. 17 are schematic diagrams illustrating a frame data of the seventh embodiment. FIG. 18 is a functional block diagram illustrating an image processing device for an interlaced stereoscopic display device As shown in FIG. 15 through FIG. 17, the image processing method of this embodiment is used for processing an image displayed by the interlaced stereoscopic display device, and includes the following steps:

Step S150: provide a first frame data 400, wherein the first frame data 400 comprises a two-dimensional image data 402 and a first viewing angle image data 404;

Step S160: provide a second viewing angle image data 406;

Step S170: provide an image distribution data 408, wherein the image distribution data 408 records a position of the first viewing angle image data 404 and a position of the second viewing angle image data 406;

Step S180: perform an encoding step to mix the image distribution data 408 and the second viewing angle image data 406 to be a second frame data 410 so as to define the position of the second viewing angle image data 406 and the position of the first viewing angle image data 404 through the image distribution data 408;

Step S190: perform a decoding step for gathering the image distribution data 408 from the second frame data 410 and transferring the image distribution data 408 to a parallax barrier panel; and Step S200: display the first frame data 400 and the second frame data 410 in sequence.

As shown in FIG. 18, in step S150 and step S170, the first frame data 400, the second viewing angle image data 406 and the image distribution 408 are provided to an image encoder 412. The first viewing angle image data 404 and the second viewing angle image data 406 can constitute a three-dimensional image. The first viewing angle image data 404 can be a left-eye image data, and the second viewing angle image data 406 can be a right-eye image data. The present invention is not limited to this, and image data types of the first viewing angle image data 404 and the second viewing angle image data 406 can be exchanged. Then, in the encoding step of step S180, the second frame data 410 is encoded by the image encoder 412, and the position of the first viewing angle image data 404 of the first frame data 400 corresponds to the position of the second viewing angle 406 of the second frame data 400. Next, the first frame data 400 and the second frame data 410 can be respectively outputted from two outputs of the image decoder 412, and be transferred to two inputs of the interlaced stereoscopic display device 416 through two transmission lines 414. The first frame data 400 and the second frame data 410 can be therefore transferred to an image decoder 420. In the decoding step of step S190, the image distribution data 408 is gathered from the second frame data 410 through the image decoder 420. Thereafter, the first frame data 400 and the second frame data 410 are respectively transferred to a display panel 422, and the image distribution data 408 is transferred to the parallax barrier panel 424. In step S200, respectively displaying the first frame data 400 and the second frame data 410 are cooperated with adjusting the barrier of the parallax barrier panel 424, so that three-dimensional images can be displayed. Accordingly, the interlaced stereoscopic display device of this embodiment can display a frame simultaneously having two-dimensional images and three-dimensional images without adding an extra output and an extra input.

The image processing method of the present invention mixes the image data and the image distribution data to be a frame data so as to reduce an output and an input between the image player and the display device while transferring the two-dimensional image data and three-dimensional image data, and the frame with two-dimensional image and three-dimensional image can be simultaneously displayed.

The image encoding method of the second embodiment through the fifth embodiment of the present invention can be performed synchronously to encode the three-dimensional image while performing an image process for a three-dimensional image synthesis, or be embedded into software of the image player. The image encoding method of the sixth embodiment should be combined with an output-driving program. The image encoding method of the first embodiment is resident on a computer system. The image encoding method of the seventh embodiment uses a specific panel. While outputting a single signal, the specific panel is the same as a general display panel. While simultaneously outputting two signals, the specific panel can regionally display a three-dimensional image.

The image decoder of the present invention can be disposed in a T-con (timing controller) or a scalar of a display panel, but is not limited to this. Only the first, fifth and seventh embodiment can be performed in real time, and do not require an extra buffer memory.

Therefore, in summary of the encoding method and the decoding method, the fifth embodiment of the present invention is an embodiment of easer practice, wider use, larger saving cost, and lower developing time.

Those skilled in the art will readily observe that numerous modifications and alterations of the device and method may be made while retaining the teachings of the invention.

What is claimed is:

1. An image processing method, comprising:
providing an image data, wherein the image data comprises at least one first image section and at least one second image section, and the image data comprises a plurality of sub-pixel data with a same color;
providing an image distribution data, wherein the image distribution data records a position of the first image section and a position of the second image section; and
performing an encoding step to bury the image distribution data in the image data so as to form a frame data, wherein the encoding step comprises:
performing a first gray-level value converting step to convert a gray-level value of the each sub-pixel data located in the first image section into a first color gray-level value; and
performing a second gray-level value converting step to convert a gray level value of the each sub-pixel data located in a second image section into a second color gray-level value so as to generate a difference of a lowest bit between the first color gray-level value and the second color gray-level value, and the image distribution data being buried in the difference.

2. The image processing method of claim 1, wherein the first image section is a two-dimensional image, and the second image section is a three-dimensional image.

3. The image processing method of claim 2, further comprising performing a decoding step for gathering the image distribution data from the frame data and transferring the image distribution data to a parallax barrier panel after the encoding step.

4. The image processing method of claim 1, wherein an operating formula of the first color gray-level value converting step is $G_1=[G_0/2]\times 2+0$, and an operating formula of the second color gray-level value converting step is $G_2=[G_0/2]\times 2+1$, wherein $G_0$ is the gray-level value of the each sub-pixel data, $G_1$ is the first color gray-level value, and $G_2$ is the second color gray-level value.

5. The image processing method of claim 1, wherein the plurality of sub-pixel data are blue sub-pixel data.

* * * * *